United States Patent
Tan et al.

(10) Patent No.: US 9,332,162 B2
(45) Date of Patent: *May 3, 2016

(54) SYSTEM AND METHOD FOR VIDEO FRAME SEQUENCE CONTROL

(75) Inventors: Kar-Han Tan, Sunnyvale, CA (US);
Irvin E Sobel, Menlo Park, CA (US);
Alan A McReynolds, Los Altos, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/376,484

(22) PCT Filed: Feb. 8, 2012

(86) PCT No.: PCT/US2012/024368
§ 371 (c)(1),
(2), (4) Date: Aug. 4, 2014

(87) PCT Pub. No.: WO2013/119227
PCT Pub. Date: Aug. 15, 2013

(65) Prior Publication Data
US 2014/0362172 A1    Dec. 11, 2014

(51) Int. Cl.
| H04N 7/14 | (2006.01) |
| H04N 5/21 | (2006.01) |
| H04N 5/04 | (2006.01) |
| H04N 9/475 | (2006.01) |
| H04N 5/265 | (2006.01) |
| H04N 5/74 | (2006.01) |
| H04N 7/15 | (2006.01) |

(52) U.S. Cl.
CPC . *H04N 5/21* (2013.01); *H04N 5/04* (2013.01); *H04N 5/265* (2013.01); *H04N 5/74* (2013.01); *H04N 7/15* (2013.01); *H04N 9/475* (2013.01)

(58) Field of Classification Search
None
See application file for complete search history.

(56) References Cited

U.S. PATENT DOCUMENTS

| 8,177,366 B2 | 5/2012 | Lee et al. |
| 2007/0188602 A1 | 8/2007 | Cowan et al. |
| 2011/0096146 A1 | 4/2011 | Hulyalkar et al. |

(Continued)

FOREIGN PATENT DOCUMENTS

| CN | 102045577 | 5/2011 |
| JP | 07-154808 | 6/1995 |

(Continued)

OTHER PUBLICATIONS

International Preliminary Report on Patentability, Aug. 21, 2014, The International Bureau of WIPO, PCT Patent Application No. PCT/US2012/024368.

(Continued)

*Primary Examiner* — Maria El-Zoobi
(74) *Attorney, Agent, or Firm* — HP Inc Patent Department

(57) ABSTRACT

A video sequence control system comprising: a video frame sequence component for providing video frames for display by a projector, the video frames having a sequence of at least one crosstalk reduction frame followed an image frames; and a synchronization control component, the synchronization control component communicatively coupled to an image capture device the synchronization control component providing a timing signal to synchronize image capture with the occurrence of the at least one crosstalk reduction frame in the video frame sequence.

13 Claims, 6 Drawing Sheets

(56) References Cited

U.S. PATENT DOCUMENTS

| | | | |
|---|---|---|---|
| 2011/0141230 A1 | 6/2011 | Bai | |
| 2011/0149047 A1 | 6/2011 | Min et al. | |
| 2011/0164123 A1 | 7/2011 | Park et al. | |
| 2012/0050567 A1* | 3/2012 | Cote | H04N 9/68 348/224.1 |
| 2012/0063799 A1* | 3/2012 | Ueno | H05B 6/06 399/67 |

FOREIGN PATENT DOCUMENTS

| | | |
|---|---|---|
| KR | 10-0820840 | 4/2008 |
| KR | 10-0935890 | 1/2010 |

OTHER PUBLICATIONS

English translation (machine-generated) of Abstract from Chinese Patent Publication No. 102045577 [retrieved Jul. 16, 2014], Retrieved from the Internet: <http://worldwide.espacenet.com/publicationDetails/biblio?CC=CN&NR=102045577A&KC=A&FT=D&ND=3&date=20110504&DB=EPODOC&locale=en_EP>.

English translation (machine-generated) of Abstract from Japanese Patent Publication No. 07-154808 [retrieved Jul. 16, 2014], Retrieved from the Internet: <http://www19.ipdl.inpit.go.jp/PA1/cgi-bin/PA1DETAIL>.

English translation (machine-generated) of Abstract from Korean Patent Publication No. 10-0820840 [retrieved Jul. 16, 2014], Retrieved from the Internet: <http://worldwide.espacenet.com/publicationDetails/biblio?DB=EPODOC&II=0&ND=3& adjacent=true&locale=en_EP&FT=D&date=20080411&CC=KR&NR=100820840B1&KC=B1>.

English translation (machine-generated) of Abstract from Korean Patent Publication No. 10-0935890 [retrieved Jul. 16, 2014], Retrieved from the Internet: <http://worldwide.espacenet.com/publicationDetails/biblio?CC=KR&NR=100935890B1&KC=B1&FT=D&ND=4&date=20100107&DB=EPODOC&locale=en_EP>.

International Search Report and Written Opinion, Oct. 16, 2012, PCT Patent Application No. PCT/US2012/024368, filed Feb. 8, 2012.

* cited by examiner

400

410 — Producing video frame sequences for display by a projector, wherein the video frame sequences include at least one crosstalk reduction frame followed by n image frames 420 — Producing a synchronization control signal, wherein the synchronization control signal provides information regarding the occurrence of at least one crosstalk reduction frame, wherein responsive to the synchronization control signal an image is captured by an image capture device

440 — Producing a synchronization control signal, wherein the synchronization control signal provides information regarding the occurrence of the at least one crosstalk reduction frame that is use to determine the time the first image is captured by an image capture device 450 — Capturing a first image of a display and a scene in front of a display, the image capture occurring when the projector for projecting a video frame sequence including least one crosstalk reduction frame followed by n image frames 114 on the display is projecting a crosstalk reduction frame 460 — Blending the captured first image with a corresponding image frame 470 — Displaying the blended image 480 — Sending the blended image over a network to a remote video conferencing site

*Fig. 4B* ent 118 communicatively coupled to an
SYSTEM AND METHOD FOR VIDEO FRAME SEQUENCE CONTROL

CROSS-REFERENCE TO RELATED APPLICATION

This application is a U.S. National Stage Application of and claims priority to International Patent Application No. PCT/US2012/024368, filed on Feb. 8, 2012, and entitled "SYSTEM AND METHOD FOR VIDEO FRAME SEQUENCE CONTROL".

BACKGROUND

When displaying a projected image and simultaneously capturing images of the projected scene or display, there can be crosstalk between the projected images and the captured content. The crosstalk can reduce the image quality (i.e. brightness, color) of the captured image frames and in addition cause distracting flicker on the display. Various attempts have been made to reduce crosstalk in the dual projection/image capture systems. In one system, a custom projector was created to reduce flicker. In another system, the display itself was changed—an active switchable diffuser was used instead of a passive screen to reduce crosstalk. However, although crosstalk may be reduced when using the active switchable diffuser for the display, it can limit the useful duty cycle of both the projector and the image capture device used in the system.

BRIEF DESCRIPTION OF DRAWINGS

The figures depict implementations/embodiments of the invention and not the invention itself. Some embodiments are described, by way of example, with respect to the following Figures.

FIG. 4A shows a flow diagram for a method for controlling the output of a video sequence according to an example of the invention;

FIG. 4B shows a flow diagram for a method of controlling the capture of a video sequence according to an example of the invention;

Figure 1A:
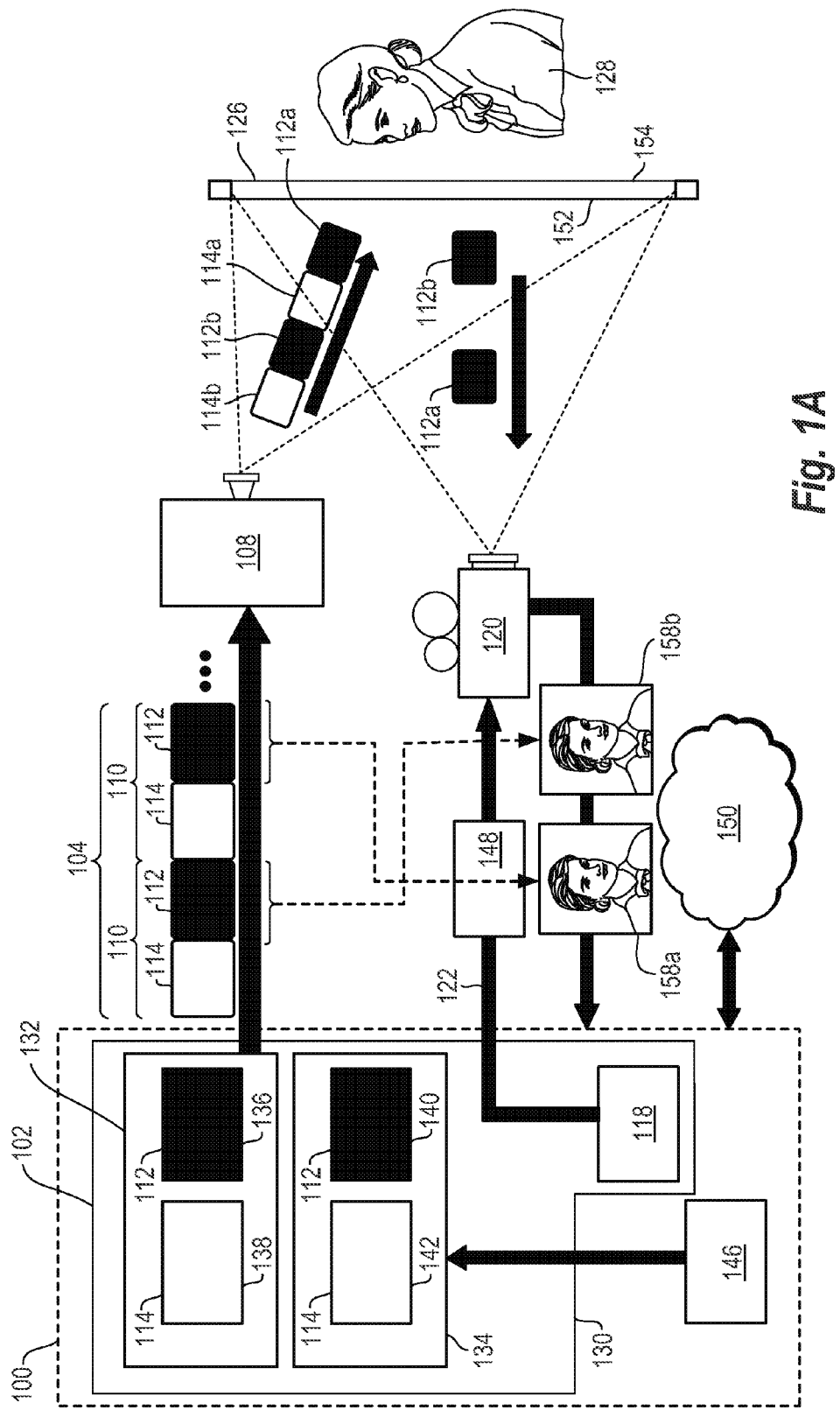
FIG. 1A shows a video sequence control system that uses time division multiplexing to reduce crosstalk according to an example of the invention.

The drawings referred to in this Brief Description should not be understood as being drawn to scale unless specifically noted.

DETAILED DESCRIPTION OF THE EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, different embodiments may be used together. In some instances, well known methods and structures have not been described in detail so as not to unnecessarily obscure the description of the embodiments.

The application describes a video sequence control system 100 comprising: a video frame sequence component 102 for providing video frames 104 for display by a projector 108, the video frames having a sequence 110 of at least one crosstalk reduction frame 112 followed by an image frames 114; and a synchronization control component 118, the synchronization control component 118 communicatively coupled to an image capture device 120, the synchronization control component providing a timing signal 122 to synchronize image capture with the occurrence of the at least one crosstalk reduction frame in the video frame sequence.

Referring to FIG. 1A shows a video sequence control system 100 that uses time division multiplexing to reduce crosstalk according to an example of the invention. For the projector/image capture system discussed, the term crosstalk refers to the unwanted light captured by the image capture device resulting from the projected video frame sequences. In one example, crosstalk is minimized or eliminated due to the introduction of at least one crosstalk reduction frame in the video frame sequence.

In the example shown in FIG. 1A, the crosstalk reduction frame 112 is a black frame. The black frame simulates an off state for the projector. A timing signal triggers image capture with the occurrence of the crosstalk reduction frame. Thus, for the example shown, image capture is triggered when the projector 108 is effectively in an off state. Because the projector is "off" and no projected image is output, crosstalk is effectively eliminated. The elimination of crosstalk provides improved quality of the video frame images.

Besides providing an improved video quality, the described system has the additional advantage of not requiring active shutters (devices that optically block light) on the projectors or cameras. Using passive shutters is simpler to implement and also avoids light loss due to imperfect shutters which may not let 100% of the light though even in "clear" through state. An "active" shutter can change state through electronic control, as opposed to a "passive" shutter which does not. In the implementation described, the image capture device is a camera which is electronically controlled to start capturing light when the projector goes black, and to stop capturing light when the projector is turned back on (the image frames are being projected).

Referring to FIG. 1A, the video frame sequence component 102 includes a synchronization control component 118. The video frame sequence control component 102 outputs a video frame sequence 110 to the projector 108 to drive the display 126, while the synchronization control component 118 sends a synchronization signal 122 to the image capture device 120 to signal to the image capture device 120 when it should capture the image of the scene.

In the example shown in FIG. 1A, the video stream 110 is comprised of two independent alternating video streams—one video stream consisting of image frames and the second video stream consisting of cross talk reduction frames. The crosstalk reduction video frames minimize the crosstalk due to the projector. In the example shown, the crosstalk reduction video frames are black/blank frames to be projected onto the display screen 126. The image video stream is comprised of image frames that are to be projected onto the display screen. In one videoconferencing example, the image frames are content to be shared by participants in the videoconferencing session. In another video conferencing example, the image frames are video of another remote participant participating in the video conferencing session.

In one example, the video sequence control component 102 is a graphics adapter in a computing device such as a computer having a CPU/RAM 146. In one example, the graphics adapter includes a quad buffer 132, 134 as shown in FIG. 1A. In the example shown in FIG. 1A, the quad buffer includes a front buffer 132 and a back buffer 134 for each of the two video streams. The quad buffer is capable of double-buffering the alternating two video streams (video stream, crosstalk reduction video stream). Double buffering allows the system to output a current frame from a "front" buffer while simultaneously computing or copying the next frame in a sequence into a "back" buffer. After the current frame is output, the system marks the front buffer as free. When the next frame is ready in the back buffer, and the front buffer is free, the buffers are "swapped"—i.e. back becomes front and vice-versa.

In the example shown in FIG. 1A, the front buffer 132 includes an image frame buffer 138 for buffering the next image frame to be output and a crosstalk reduction frame buffer 136 for buffering the next crosstalk reduction frame to be output. The video stream 104 is output from the front buffer 132 to the projector 108. In the example shown, the cross talk reduction frame 112 is output first followed by the image frame 114. Similarly, the back buffer 134 includes an image frame buffer 142 for buffering an image frame and a crosstalk reduction buffer 140 for buffering a crosstalk reduction frame. When the video frames from the front buffer are output to the projector 108—the video frame from the back buffer are transferred to the front buffer (next frames to be output).

In one example, the video frame sequence component 102 is a 3D graphics adapter or other fast frame rate graphics adapter. By fast frame rate graphics adapter we mean a graphics adapter suitable for processing and outputting dual video streams without observable flicker to the majority of the population. In one example, the fast frame rate graphics adapter is suitable for processing video frames at greater than or equal to 120 Hz. Displays, such as television screens, can run at a rate of 60 Hz—a rate that the majority of the population does not notice flicker. However, TV displays are projecting a single image video stream. Because we have two video streams (one image and one crosstalk reduction)—we need to run the display at a rate greater than or equal to twice the 60 Hz rate—or 120 Hz or greater.

In the example shown in FIG. 1A, the display screen 126 is a see-through display screen. In one example, the see-through display screen 126 is comprised of a relatively low concentration of diffusing particles embedded within a transparent screen medium. The low concentration of diffusing particles allows a camera 120 or other image capture device to capture an image through the screen 126 (providing that the subject is well lit), while diffusing enough of the light from the projector 108 to form an image on the display screen. In another example, the display screen 126 can be a holographic film that has been configured to accept light from the projector 108 within a first range of angles and to transmit light that is visible to the remote participant within a different range of viewing angles. The holographic film is otherwise transparent. In both examples, light projected onto the first surface 152 within the first range of angles can be observed by viewing the second surface 154, but light striking the second surface 154 is transmitted through the screen to the camera. In both examples the camera also captures light from the projector diffused or scattered off of the first surface.

The video frame sequence outputs a plurality of video frame sequence of n image frames 112 followed by at least one crosstalk reduction frame. In the example shown in FIG. 1A, n is equal to one and there is one crosstalk reduction frame. Thus, for the video frame sequence shown in FIG. 1A the video frames alternate between image frames and crosstalk reduction (black) frames.

In FIG. 1A, the video sequence control system 100 is used to provide video frame sequences used in a video conferencing session. In the video conferencing configuration shown, the display is a see-through screen. The participant (shown) at the local site is seen by (1) remote participants (not shown) through the see-through display screen and (2) sees the image frame sequence projected by the projector 108 onto the see-through display screen 126. The projected video image frame may be, for example, content that the local and/or remote participants in a video conferencing session wish to share or interact with. In another example, the projected image could be an image of remote participant in a video conferencing session.

In one example, the crosstalk reduction frame 112 is a dimmed or reduced intensity frame. By dimmed or reduced intensity we mean the crosstalk reduction frame has an intensity lower than the corresponding image frames in the same video sequence. The dimmed image can be a reduced intensity version of the black frame (i.e. a gray frame) or alternatively, a dimmed version of the image frame.

In the example shown in FIG. 1A, the crosstalk reduction frames are blank or black frames. The purpose of the lower intensity video frame is to provide a time interval when the image capture device 120 is capturing a video frame image of the scene behind the see-through display screen which minimizes the interference or crosstalk caused by the projected image, while increasing the brightness and reducing the flicker perceived by the local user or participant 128.

In the example shown in FIG. 1A, the crosstalk reduction frame 112 is a black frame (uniform distribution of black pixels across the video frame.) However, other crosstalk reduction frames that have lower intensity than its corresponding image frame can be used. The goal of the crosstalk reduction frame is to lower the crosstalk between the projected image and the image captured by the camera. For example, instead of the dimmed image having the lowest possible intensity (0%)—black frame, the dimmed image may be for example, a gray image having some percentage of the possible intensity range.

In another example, the intensity of the crosstalk reduction frame might be increased from its lowest level (black) to a higher level. One case where this might be a reasonable option would be the case where the projected image frames are likely to be very bright. For the case where the projected images go between a very bright projected image to a black video frame (the crosstalk reduction frame), the high amount of change between the two projected images that the human eye perceives—increases the perception of flashing and flicker. To reduce this effect, the crosstalk reduction frame color could be changed from black to a gray color (higher intensity.) In another example, where the display screen is not bright (in some cases where a see-through display is used), it is not necessary to have the crosstalk reduction frame be completely black in order to substantially reduce crosstalk. In one example, fully hardware or software-controllable dimming allows crosstalk reduction to be turned on/off or vary continuously between zero (black) and full (white). In another example, crosstalk reduction can also be applied in a spatially varying fashion. Flexible dimming or application of a flexible dimming pattern enables a wide range of applications.

In another example, other factors are balanced with the goal of crosstalk reduction. For example, the crosstalk reduction might be minimized but not to the greatest degree possible to try and take into account other factors. For example, in some cases you might want to adjust the ratio of the ambient lighting of the scene to the projected image in order to not stress the dynamic range of the camera. For example, for the case where the display screen 126 is much brighter than the environment it may be desirable to dim or reduce the intensity of the crosstalk reduction frame to reduce the crosstalk. However, the intensity level of the crosstalk reduction frame should not be within the dynamic range of the camera—so that it is not observable by the camera.

Referring to FIG. 1A, there are two "observers" in the implementation—one is the camera 120 in front of the display screen, the other is the viewer 128. Two system goals are that we do not want the viewer 128 to be annoyed by flicker and that we also want to capture a clear image with the image capture device 120. This is in part achieved by manipulating the light in the crosstalk reduction frame to balance the needs of the two "observers." If there is a lot of light in the scene on the viewer 128, then we can increase the light in the crosstalk reduction frame. However, if we increase the light in the crosstalk reduction frame by too much, we wash out details in the image captured by the camera 120.

In one example, the light intensity of the crosstalk reduction frame (on a scale of 1 to 0), is balanced based on factors including but not limited to crosstalk reduction. Referring to FIG. 1A, the tradeoffs or factors that require balancing could be: (1) the need for flicker reduction for the viewer viewing the display from the back side 154 of the display, and (2) the need for the camera 120 to get a clear image of the viewer 128 on the back side 154 of the display. The two factors are balanced to get the desired results for both the viewer 128 and the camera 120.

In the example shown in FIG. 1A, the crosstalk reduction frame 112 is black frame (no light output) which simulates the projector 108 being in an off state. In one example, the image capture device is a camera. The camera is synchronized to capture an image during the time period when the crosstalk reduction frame is being displayed. For the case where there is a see-through display screen, the camera captures the scene in front of the display screen, the display and the scene behind the see-through display screen. Thus, for the video conferencing example where there is a participant 128 on the other side of the display screen—the camera 120 captures the image of the participant on the other side of the display screen. Because the projector is off when the image is captured, the camera does not capture the projected image.

The video sequence control system 100 outputs a video stream 104 comprised of a plurality of video frame sequences 110. The video frame sequences are comprised of a number of image frame(s) followed by a crosstalk reduction frame(s). In FIG. 1A, the video frame sequence 110 can be described as one crosstalk reduction frame followed by one image frame or alternatively one image frame followed by one crosstalk reduction frame, dependent upon where you define the beginning or start of the video frame sequence. In the example shown in FIG. 1B, the video frame sequence is a repetitive pattern of image frames and crosstalk reduction frames shown starting with the crosstalk reduction frame.

Figure 1B:
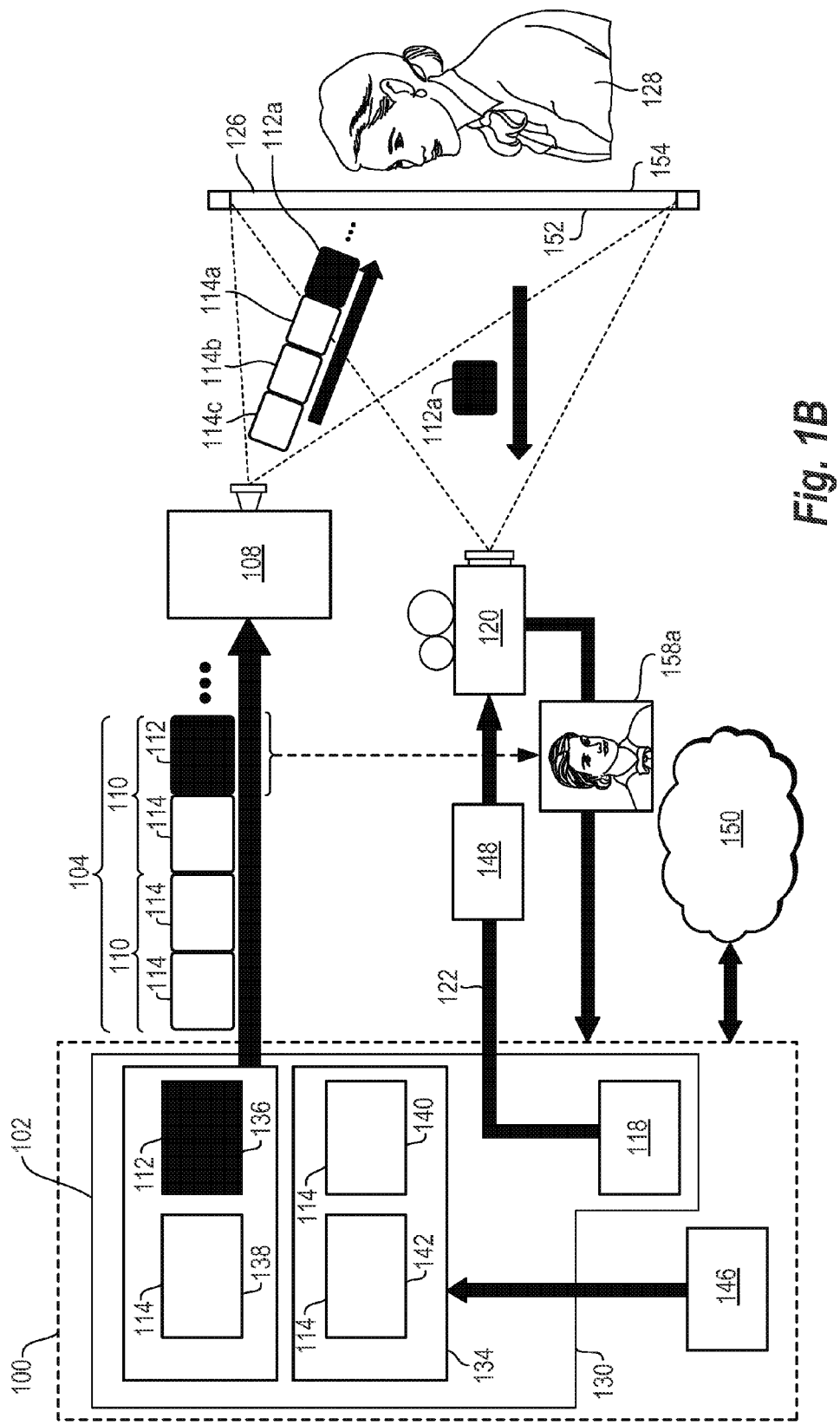
FIG. 1B shows the video sequence control system shown in FIG. 1A with a modified video frame sequence according to an example of the invention.

FIG. 1B shows the video sequence control system shown in FIG. 1A with one possible alternative video frame sequence.

In FIG. 1B the ratio between the number of image frames and crosstalk reduction frames in the video frame sequence is three to one. Thus in FIG. 1B, the video frame sequence is one crosstalk reduction frame followed by three image frames. In one example, the repeatable pattern of the video frame sequence is defined by software in the graphic adapter.

Referring to the video frame sequence output from the projector shows a series of image frames and crosstalk reduction frames. In one example, the crosstalk reduction frame 112 is for purposes of reducing crosstalk and is not meant to be seen by the user. In other words, for the case where a crosstalk reduction frame (black frame) is output—it is intended that the viewer of the display only to see the image and not the black frame. If the black frames are shown at a rate of greater than or equal to 60 Hz, the majority of the population will see the image frame and not notice the blank frame. In contrast, when the video sequence is being projected at a substantially lower frame rate (say 30 Hz), noticeable flicker is increased.

The video sequence control system 100 is communicatively coupled to a projector so that the output of the video sequence control system (the video stream) is input to the projector 108. In the example shown in FIG. 1A, the projector is an off-angle projector. The projector should have a frame rate sufficient to handle the dual independent video streams without observable flicker. As previously stated, many current display standards set this rate 60 Hz. For the dual video stream (image and crosstalk frames) of the example, the frame rate of the projector should be twice as fast as the standard rate since the display control system is outputting twice as many frames in the same time period. Thus, the frame rate of the projector should be greater than or equal to 120 Hz.

Referring to FIG. 1A, the video sequence control component 102 includes a synchronization control component 118. The synchronization control component 118 is communicatively coupled to an image capture device and is used to provide a signal to the image capture device 120 related to the occurrence of the at least one crosstalk reduction frame. The signal to the image capture device is used to trigger the start of image acquisition in order to capture an image when the crosstalk reduction frame is being projected.

In one example, the video sequence control component is a 3D graphics adapter. Some 3D graphics adapters are meant to work in combination with 3D glasses. These graphics adapters may send a synchronization signal to synchronize the left and right frames of the video with the left and right lenses of the 3D glasses. In one example, the synchronization signal or some modified version of the 3D graphics synchronization signal is used to trigger the opening and closing of the image capture device so that the camera captures an image when the crosstalk reduction frame is displayed. This ensures that the amount of light from the projector is minimized during image capture, therefore reducing the visual crosstalk in the captured images.

Referring to FIG. 1A shows a synchronization control signal 122 communicatively coupled to an image capture device 120. In one example, the synchronization control signal 122 is directly coupled to the image capture device. In the example shown in FIG. 1A, the image capture device is communicatively coupled to the synchronization control signal via an optional signal converter 148. The connection between the video sequence control component 102 and the image capture device and/or the optional signal converter 148 can be implemented as a wired connection, a wireless connection or a combination of the two.

In one example, the synchronization control signal 122 provides both a synchronization signal and a command signal to the image capture device. The synchronization control signal provides information to the image capture device of when the crosstalk reduction frame is being projected. The command line provides information to the image capture device of what camera function to perform. In one example, the command output to the image capture device is to start or terminate image acquisition by the image capture device. The timing of the start or termination of image acquisition is done in synchronization with the projection of the crosstalk reduction frame.

The signal converter 148 is optional and is dependent upon the signal generated by the video sequence control component and the signal requirements of the image capture device. In one example, the signal converter could reduce the frequency of the synchronization trigger frequency. For example, assume a 120 Hz synchronization signal (the same frequency as the projector) was generated by the video sequence control component. If the image capture device operates at 30 Hz, then the signal converter might trigger the synchronization signal to occur every fourth count. In another example, a camera requirement might be a specific signal pattern that follows an industry standard protocol. In this example, the signal converter could translate a simple triggering synchronization signal to the pattern according to industry standard protocol.

Referring to FIG. 1A shows an image capture device or video camera. As previously described a synchronization signal is sent to the image capture device to instruct it to start or time the image acquisition so that it occurs when the crosstalk rejection frames are projected onto the display screen. For example, assuming the black crosstalk reduction frame 112a is projected at a time $t_{proj1}$. Then the camera opens its shutter at this time, captures an image and outputs a corresponding photograph 158a. The corresponding photograph is of the display, the scene in front of the display and for the case of a see-through screen, the viewer behind the display screen. Similarly assuming a second black crosstalk rejection frame is projected at time $t_{proj2}$, then the camera starts image acquisition, captures an image and outputs the corresponding photograph 158b.

In the configuration shown in FIG. 1A, the rate that the image capture device operate at can be different than the rate that the projector operates at. Further the display refresh rate can be different the image capture device frame rate. Thus for example, you can capture an image with the image capture device at a rate of one frame per second and have a display refresh at 200 Hz. However, where the projector is running at 120 Hz, the display needs to refresh at 120 Hz to provide the crosstalk reduction frame at a minimum rate of 60 Hz.

Because the video camera 120 can operate at a lower rate, a camera with a lower operating rate (say 30 Hz) could be used. The advantage of using a camera with a low operating rate is that the sensor for a lower operating camera doesn't have to be as fast—potentially lowering camera cost. Further, lower frame rates reduce the demands of video compression and the transmission bandwidth of the system. The operating rate of the camera also affects the bus that can be used. For example a 30 Hz HD camera could use a Gigabit Ethernet bus while a 60 Hz HD camera would need to use a camera link bus.

The photographs or images captured when the crosstalk reduction frame is being projected are input into a computer or other type of computing device. The captured images may be recorded and stored in the memory of the computer and/or transmitted to the network. In one example, the configuration shown is used for video conferencing between two remote locations. In the case shown, the camera captures images of the local user and images of the local user are transmitted across the network to the remote location. Similarly images captured of the remote user are transmitted across the network to the display at the local location.

FIG. 1B shows the video sequence control system 100 configuration shown in FIG. 1A with a different video frame sequence according to an example of the invention. The video frame sequence in FIG. 1A is alternating image frames with crosstalk reduction frames. However, the video frame sequence can be an arbitrary number of image frames followed by at least one crosstalk reduction frame. In the example shown in FIG. 1B there is a single crosstalk reduction frame 112a followed by three image frames 114a, 114b, 114c. Compared to the video frame sequence shown in FIG. 1A, the number of video frames is increased—increasing the quality of the projected image.

Figure 2:
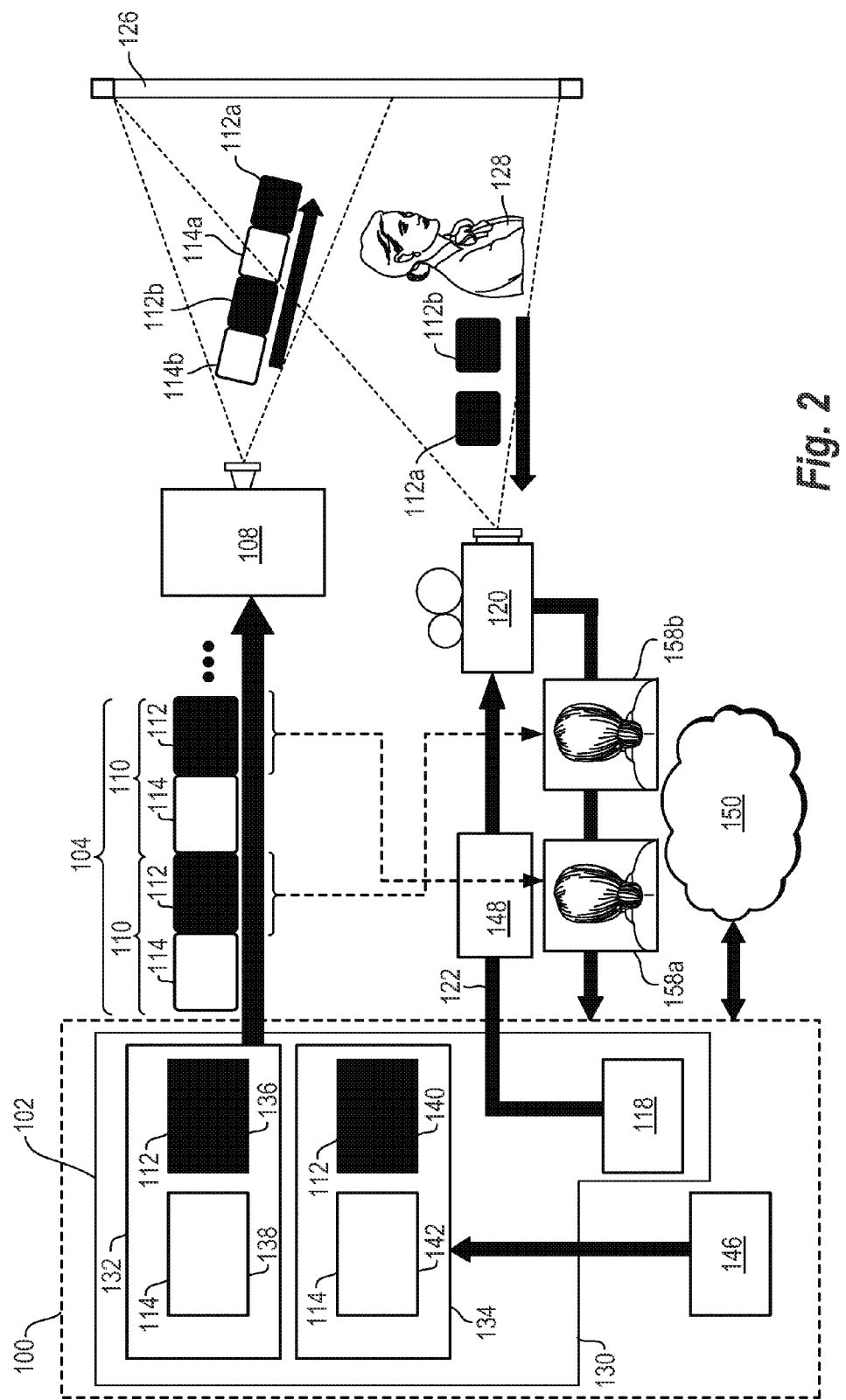
FIG. 2 shows a video sequence control system that uses time division multiplexing to reduce crosstalk where the frames in the video frame sequence are displayed on an opaque whiteboard according to an alternative example of the invention.

FIG. 2 shows a video sequence control system that uses time division multiplexing to reduce crosstalk where the frames in the video frame sequence are displayed on an opaque surface according to an alternative example of the invention. As in the case shown in FIGS. 1A and 1B, the system configuration shown in FIG. 2 includes a video sequence control component 102 (in one case a graphics adapter) which outputs a video stream comprised of a plurality of video sequences. However, instead of being projected onto a see-thru display, in FIG. 2 the video stream is projected onto an opaque display 126—such as a whiteboard. Also, instead of the camera capturing a front view of a participant seen through the see-through screen, the camera capture the back or rear view of the participant. The camera is capturing images of the scene (the projected content on the display and the person standing in front of the display.)

Similar to the example described with respect to FIGS. 1A and 1B, in FIG. 2 the projector 108 projects a sequence of crosstalk reduction frames 112 and image frames 114. For the example shown, the crosstalk reduction frame is a black frame that simulates the projector being off. Thus, when the projector is off, it captures the image of the person standing in front of the display screen—with no content being projected onto the screen. Because no image is being projected onto the display screen—the interference between the projected image is eliminated—minimizing crosstalk between the projected image and the captured image.

In one example, where the scene shown in FIG. 2 is being captured for a video conferencing session, the introduction of the crosstalk reduction frames into the video frame sequence has the added benefit of minimizing/eliminating the shadow cast by the object(s). The shadow cast by the projector can be eliminated from the captured image by turning off the projector (inserting a black crosstalk reduction function) during image capture. For example, the projector could be turned off $\frac{1}{120}$th of a second before the image capture.

Now we have a picture of the object/person in the scene but not the projected content. However, we know what the projected content is—the video stream 104 projected by the projector. In one example, we take (1) the image frames projected by the projector and (2) the image (with no shadow cast by the projector) and blend the two images. The merged image/video frame sequence would be a video frame sequence with the crosstalk and the shadow caused by the projector eliminated. In one example, the merged image could be sent to a remote participant in the video conference session over the network 140. When the merged image is displayed, the remote participant would view video at the local site—however, the viewed video stream would show the projected image stream with the shadow eliminated (black crosstalk reduction frame) or minimized. Also, although in one example the whiteboard is opaque—it is possible to implement the front-projection whiteboard system shown in FIG. 2 in combination with a semi-transparent whiteboard. However, for this example, the removal of the shadow is not as efficient.

Figure 3:
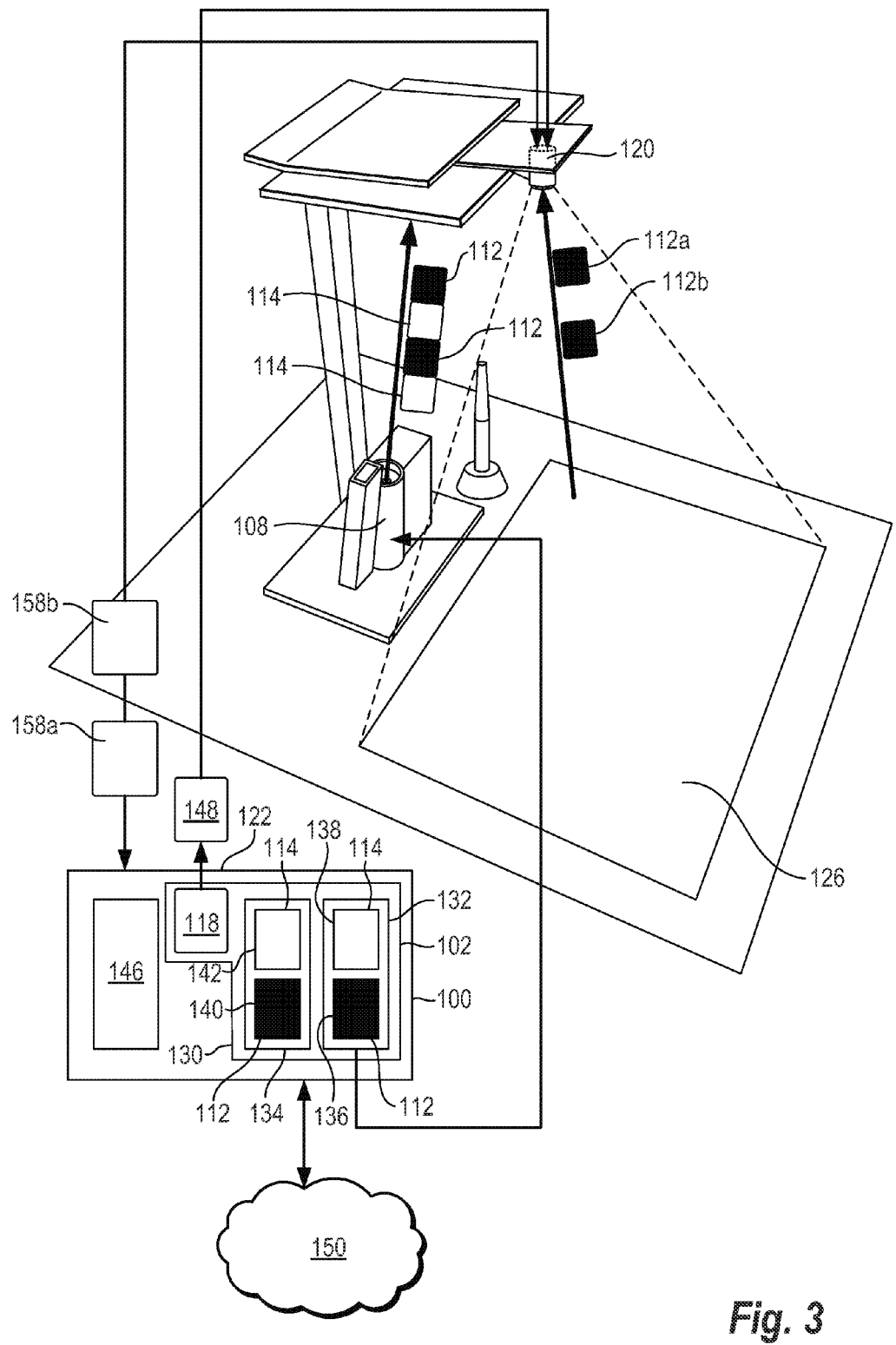
FIG. 3 shows a video sequence control system that uses time division multiplexing to reduce crosstalk where in the video frame sequence are displayed on an opaque workspace according to an example of the invention.

FIG. 3 shows a video sequence control system 100 that uses time division multiplexing to reduce crosstalk where the frames in the video frame sequence are displayed on a projection/image capture system according to an alternative example of the invention. One example of a desktop projection capture system is described in more detail in International Patent Applications PCT/US2011/046253 entitled PROJECTION CAPTURE SYSTEM AND METHOD filed 2 Aug. 2011 and PCT/US2011/053947 entitled PORTABLE PROJECTION CAPTURE DEVICE filed 29 Sep. 2011.

Referring to FIG. 3 shows a perspective view illustrating one example of a projection capture system and an interactive workspace 12 with its exterior housing of the projection capture system removed. The projection capture system includes an image capture device 120 and a projector 108. The image capture device and projector are both communicatively coupled to the controller. The image capture device captures the scene in front of or displayed on the workspace. The projector projects the video stream sequence onto the workspace or display area 126.

The system configuration shown in FIGS. 1A, 1B, 2 and 3 attempt to minimize the crosstalk between the projected image and the image captured by the image captured device. In addition, the shadow caused by the projector 108 can be eliminated using the technique detailed with respect to FIG. 2. Thus the person in the room would see the shadow cause by in object in the path of a projected image. However, using techniques described with respect to the system in FIG. 2, the shadow cast by the projector could be eliminated from the video stream captured for example for a video conferencing session.

FIG. 4A shows a flow diagram for a method 400 for controlling the output of a video sequence according to an example of the invention. Referring to FIG. 4A show a method for controlling the output of a video frame sequence comprising the steps of: producing video frame sequences for display by a projector 108 (step 410), wherein the video frame sequence include at least one crosstalk reduction frame 112 followed by n image frames 114; and producing a synchronization control signal (step 420), wherein the synchronization signal is communicatively coupled to an image capture device, wherein the synchronization control signal provides information regarding the occurrence of the at least one crosstalk reduction frame, wherein responsive to the synchronization control signal an image is captured by the image capture device.

FIG. 1A provides a snapshot in time that illustrates how some of the steps in the method of FIG. 4A can be implemented according to one example. Referring to FIGS. 1A and 4, shows the step of providing video frame sequences for display by a projector 108 (step 410). In FIG. 1A, the video frame sequences are generated by the video frame sequence component 102. The video frame sequence includes at least one crosstalk reduction frame 112 followed by n image frames 114, wherein the at least one crosstalk reduction frame 112. FIG. 1A shows a video sequence pattern of alternating crosstalk reduction frames 112 and image frames 114. The video sequence is output to a projector 108. The projector 108 displays the video sequence on the display 126.

FIG. 1A also shows how a synchronization signal is produced by the video frame sequence component 102 in one example. The synchronization signal (or a modified version of the synchronization signal) is input to the camera and used to determine when the image capture occurs. In the example shown in FIG. 1A, the image capture occurs when the crosstalk reduction frames (112a and 112b, for example) are projected to the display screen. A synchronization control signal (step 420) is output to the camera instructing the camera to capture the image at the same time the crosstalk reduction frame is being projected onto the display screen.

After the video stream is produced, the scene and front of the display and the display (the content shown on the display) are captured by an image capture device. Specifically, the method shown in FIG. 4B shows an example of capture, where the image capture occurs where there is no projection by the projector (simulate an off state) to minimize the shadow and to eliminate the shadow caused by the projector. FIG. 4B shows a flow diagram for one method of controlling the capture of a video sequence according to an example of the invention.

Referring to FIG. 4B shows a method of controlling the capture of frames in a video frame sequence (step 430), comprising the steps of: capturing a first image of a display and the scene in front of a display, the image capture occurring when the projector is projecting a crosstalk reduction frame (step 440); and blending the captured image with at least the image frames from the video frame sequence (step 450); and displaying the blended image (step 460 The method of eliminating shadow from the captured images shown in FIG. 4B is described with respect to implementation on an opaque whiteboard as described for the implementation shown in FIG. 2 and with respect to a projection capture system with respect to the implementation shown in FIG. 3. The improved images (images with the shadow removed) can be sent over the network to the remote participants in the video conferencing session.

Figure 5:
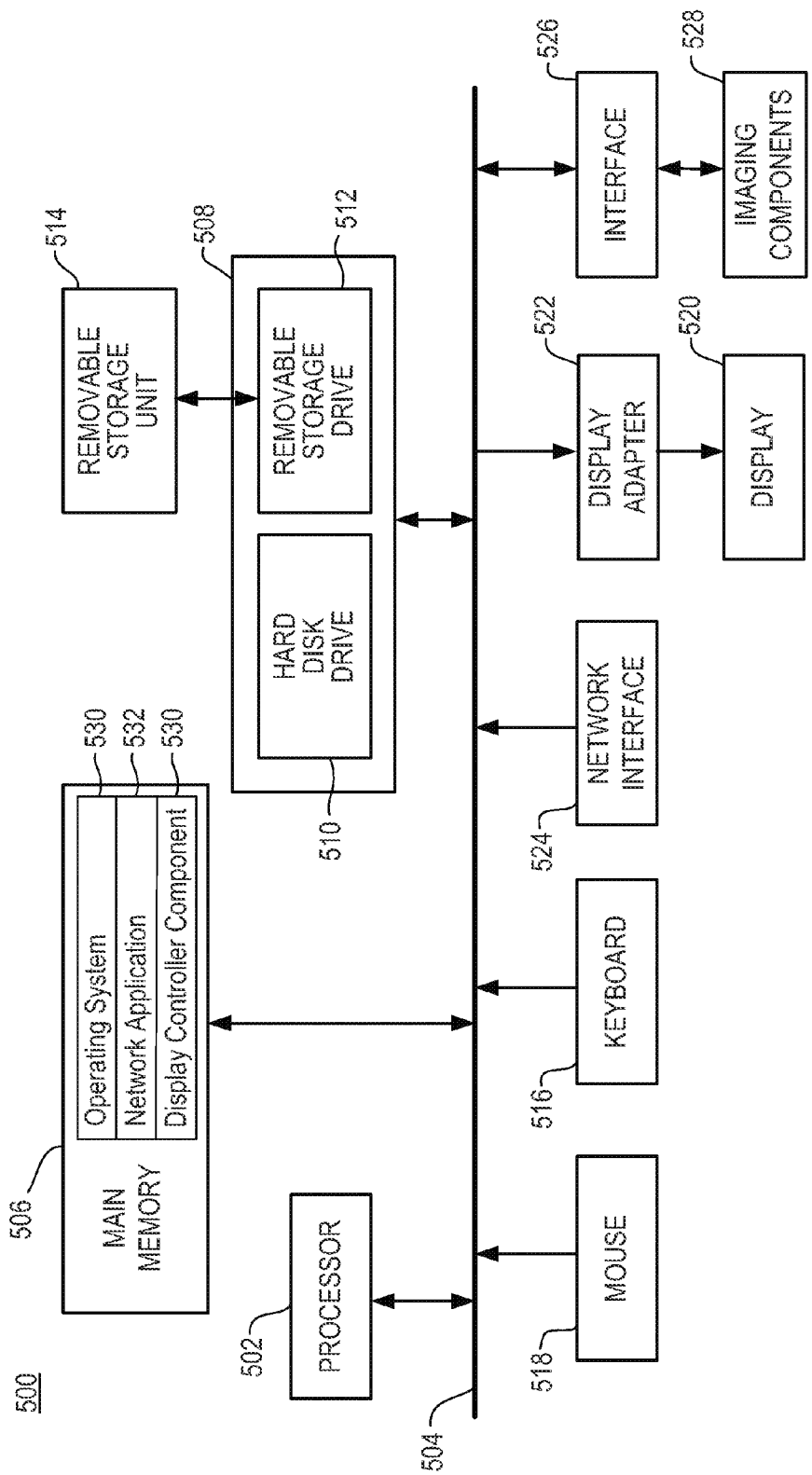
FIG. 5 shows a computer system for implementing the method shown in FIGS. 4A and 4B described in accordance with examples of the present invention.

FIG. 5 shows a computer system for implementing the methods shown in FIGS. 4A and 4B and described in accordance with the examples herein. The computing apparatus 500 includes one or more processor(s) 502 that may implement or execute some or all of the steps described in the method 400. Commands and data from the processor 502 are communicated over a communication bus 504. The computing apparatus 500 also includes a main memory 506, such as a random access memory (RAM), where the program code for the processor 502, may be executed during runtime, and a secondary memory 508. The secondary memory 508 includes, for example, one or more hard drives 510 and/or a removable storage drive 512, representing a removable flash memory card, etc., where a copy of the program code for the method 400 may be stored. The removable storage drive 512 reads from and/or writes to a removable storage unit 514 in a well-known manner.

These methods, functions and other steps described may be embodied as machine readable instructions stored on one or more computer readable mediums, which may be non-transitory. Exemplary non-transitory computer readable storage devices that may be used to implement the present invention include but are not limited to conventional computer system RAM, ROM, EPROM, EEPROM and magnetic or optical disks or tapes. Concrete examples of the foregoing include distribution of the programs on a CD ROM or via Internet download. In a sense, the Internet itself is a computer readable medium. The same is true of computer networks in general. It is therefore to be understood that any interfacing device and/or system capable of executing the functions of the above-described examples are encompassed by the present invention.

Although shown stored on main memory 506, any of the memory components described 506, 508, 514 may also store an operating system 530, such as Mac OS, MS Windows, Unix, or Linux; network applications 532; and a display controller component 530. The operating system 530 may be multi-participant, multiprocessing, multitasking, multi-threading, real-time and the like. The operating system 530 may also perform basic tasks such as recognizing input from input devices, such as a keyboard or a keypad; sending output to the display 520; controlling peripheral devices, such as disk drives, printers, image capture device; and managing traffic on the one or more buses 504. The network applications 532 includes various components for establishing and maintaining network connections, such as software for implementing communication protocols including TCP/IP, HTTP, Ethernet, USB, and FireWire.

The computing apparatus 500 may also include an input devices 516, such as a keyboard, a keypad, functional keys, etc., a pointing device, such as a tracking ball, cursors, mouse 518, etc., and a display(s) 520. A display adaptor 522 may interface with the communication bus 504 and the display 520 and may receive display data from the processor 502 and convert the display data into display commands for the display 520.

The processor(s) 502 may communicate over a network, for instance, a cellular network, the Internet, LAN, etc., through one or more network interfaces 524 such as a Local Area Network LAN, a wireless 402.11x LAN, a 3G mobile WAN or a WiMax WAN. In addition, an interface 526 may be used to receive an image or sequence of images from imaging components 528, such as the image capture device.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A video sequence control system comprising:
    a video frame sequence component for providing video frames for display by a projector, the video frames having a sequence of at least one crosstalk reduction frame followed an image frames;
    a synchronization control component, the synchronization control component communicatively coupled to an image capture device the synchronization control component providing a timing signal to synchronize image capture with the occurrence of the at least one crosstalk reduction frame in the video frame sequence; and
    a signal converter communicatively coupled to the synchronization control component and the image capture device, the signal converter for modifying the timing signal provided by the synchronization control component.

2. The video sequence control system recited in claim 1 wherein the crosstalk reduction frame has a low intensity, whereby the lower the intensity of the crosstalk reduction frame—the lower the amount of crosstalk.

3. The video sequence control system recited in claim 1 wherein the crosstalk reduction frame has a spatially varying pattern.

4. The video sequence control system recited in claim 1 wherein the video frames are displayed on a see-through display screen and the crosstalk reduction frame intensity is chosen to balance the reduction of flicker of the projected image with the clarity of the captured image.

5. A method of controlling the capture of video frames in a video frame sequence comprising the steps of:
    producing video frame sequences for display by a projector, wherein the video frame sequence include at least one crosstalk reduction frame followed by an image frames;
    producing a synchronization control signal, wherein the synchronization signal is communicatively coupled to an image capture device, wherein the synchronization control signal provides information regarding the occurrence of the at least one crosstalk reduction frame, wherein responsive to the synchronization control signal an image is captured by the image capture device; and
    modifying the timing signal provided by the synchronization control component.

6. The method recited in claim 5, wherein the modification is performed by a signal converter.

7. The method recited in claim 5 further including the step of sending the captured image over the network to a remote video conferencing site.

8. The method recited in claim 5 wherein the crosstalk reduction frame is a black frame.

9. The method recited in claim 5 wherein the crosstalk reduction frame has a spatially varying pattern.

10. A non-transitory computer readable storage medium having computer readable program instructions stored thereon for causing a computer system to perform instructions, the instructions comprising the steps of:
    capturing a first image of a display and a scene in front of a display, the image capture occurring when a projector for projecting a video frame sequence including at least one crosstalk reduction frame followed by n image frames on the display is projecting a crosstalk reduction frame;
    blending the captured first image with a corresponding image frame; and
    producing a synchronization control signal, wherein the synchronization control signal provides information regarding the occurrence of the at least one crosstalk reduction frame that is used to determine the time the first image is captured by an image capture device.

11. The non-transitory computer readable storage medium recited in claim 10 wherein the computer readable program instructions further include the step of displaying the blended image on the display screen.

12. The non-transitory computer readable storage medium recited in claim 10 wherein the display is opaque.

13. The non-transitory computer readable storage medium recited in claim 10 wherein the computer readable program instructions further including the step of sending the blended image over the network to a remote video conferencing site.

* * * * *